(12) United States Patent
Brunner

(10) Patent No.: US 8,220,865 B2
(45) Date of Patent: Jul. 17, 2012

(54) CONNECTING ARRANGEMENT

(75) Inventor: Markus Brunner, Bietigheim-Bissingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/789,557

(22) Filed: May 28, 2010

(65) Prior Publication Data
US 2010/0327631 A1    Dec. 30, 2010

(30) Foreign Application Priority Data

Jun. 24, 2009 (DE) .................. 10 2009 030 137

(51) Int. Cl.
*B62D 27/02* (2006.01)
(52) U.S. Cl. ............ 296/187.1; 296/193.02; 296/29
(58) Field of Classification Search ........... 296/187.12, 296/193.05, 193.06, 203.03, 29, 30, 187.01, 296/193.02
See application file for complete search history.

(56) References Cited

U.S. PATENT DOCUMENTS

| | | | |
|---|---|---|---|
| 5,226,696 A * | 7/1993 | Klages et al. ........... 296/203.01 |
| 5,549,352 A * | 8/1996 | Janotik et al. ............... 296/209 |
| 6,676,183 B2 * | 1/2004 | Yoshida et al. ............ 296/30 |
| 7,185,933 B2 * | 3/2007 | Goransson ................. 296/30 |
| 7,686,387 B2 * | 3/2010 | Yustick et al. ............ 296/205 |
| 7,854,472 B2 * | 12/2010 | Gomi ..................... 296/193.07 |
| 2006/0278463 A1 | 12/2006 | Anzai et al. |
| 2008/0084093 A1 * | 4/2008 | Kishima et al. ........ 296/203.03 |

FOREIGN PATENT DOCUMENTS

| | | |
|---|---|---|
| DE | 24 56 740 | 8/1976 |
| DE | 3727203 A1 | 2/1989 |
| DE | 602006000934 T2 | 6/2009 |
| DE | 10 2008 027 199 | 12/2009 |

* cited by examiner

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

A connecting arrangement (1) is provided for connecting a stiffening beam (2) to a bracket (3) in a motor vehicle. The stiffening beam (2) and the bracket (3) having mounting sections (4, 5) that can be plugged into one another. The mounting sections (4, 5) each have two slots (6, 7) situated opposite one another. The slots (6, 7) at least partially overlap in pairs and are offset from one another by a predetermined angle ($\alpha$) in the mounted position of the mounting sections (4, 5) to facilitate the insertion of a fastening element (12) into the slot pairs (6, 7). The connecting arrangement (1) simplifies the mounting of the fastening element (12) and enables an even retroactive correction or alignment of the connecting arrangement (1) in the plugging-together direction (13) of the mounting sections (4,5).

16 Claims, 1 Drawing Sheet

CONNECTING ARRANGEMENT

CROSS-REFERENCE TO RELATED APPLICATIONS

This application claims priority under 35 USC 119 to German Patent Application No. 10 2009 030 137.2 filed on Jun. 24, 2009, the entire disclosure of which is incorporated herein by reference.

BACKGROUND OF THE INVENTION

1. Field of the Invention

The invention relates to a connecting arrangement for connecting a stiffening beam to a bracket in a motor vehicle.

2. Description of the Related Art

German patent application DE 10 2008 027 199.3 discloses a transverse stiffening structure for a motor vehicle with two transverse beams that extend in the vehicle transverse direction and that have an upwardly open guide contour. Transverse stiffening elements are guided or held in the guide contour of each transverse beam. At least the transverse stiffening elements are connected to an adjacent B pillar by a deformable crash bracket that absorbs energy in the event of an accident. This transverse stiffening structure for a motor vehicle is simple to mount and ensures a particularly high level of protection in the event of a side impact.

DE 24 56 740 describes a screw connection for sheet-metal screws. The screw connection of DE 24 56 740 has a nut piece formed by two sheet-metal regions bent out of a sheet-metal part. The bent-out sheet-metal regions are provided with slots aligned at right angles to one another and overlap in such a way that a sheet-metal screw can be screwed into the common through-opening of the overlapping slots. The overlapping slots in the two bent-out sheet-metal regions thereby form, by means of their common through-opening, a nut for a screw. Other components also can be fastened, if desired, to fastened to a screw connection of this type.

A stiffening beam and a bracket of a motor vehicle also conventionally are connected to one another to one another by welding. A welded connection, however, has disadvantages. In particular, the welded connection can be released only by destroying the connecting point, and a retroactive correction or alignment of the connecting point is not possible without destruction. Furthermore, a welded connection cannot be pre-mounted in a correctable manner without destruction by means of the welding process itself, which leads to increased mounting expenditure.

The invention is concerned with an improved connecting arrangement that is characterized by correctability of the connecting point.

SUMMARY OF THE INVENTION

The invention relates to a connecting arrangement for connecting a stiffening beam to a bracket in a motor vehicle. At least two slots are arranged opposite one another in a respective mounting section of the stiffening beam and the bracket. The slot of the stiffening beam and the slot of the bracket are offset with respect to one another by a predetermined angle. The slots are at least partially overlapped in the mounted position of the mounting sections, and at least one fastening element may extend through said slots in the mounted position. The slots that overlap one another and the fastening element that extends through at least two slots enables the connecting arrangement to be produced in a stable fashion. Additionally, the predetermined angle between the slot of the bracket and the slot of the stiffening beam simplifies the insertion of the fastening element because the alignment of the mounting sections relative to one another during mounting is variable. Furthermore, the position of the stiffening beam with respect to the bracket can be corrected or aligned during mounting even when the fastening element has been inserted. In this way, it is possible for a connecting arrangement to be aligned more precisely and if appropriate to be corrected even after the fastening element is fixed in the respective slots.

The mounting sections of the bracket and of the stiffening beam may be of complementary design to one another with regard to at least one inner surface and one outer surface. In this way, the mounting section of one component can be plugged in positively locking fashion onto the mounting section of the other component so that the slots arranged in the mounting section at least partially overlap and can be extended through by at least one fastening element. The complementary design of the mounting sections with respect to one another enables the connecting arrangement to be fixed in a stable manner at least transversely with respect to the plugging-on direction, and therefore mounting is facilitated.

The mounting section that engages around the respective other mounting section need not be closed completely, but rather may have an opening or a cutout at least at one side. This allows material to be saved and simplifies mounting since the outer mounting section can be not only plugged onto the inner mounting section, but also can be inserted via the opening or cutout.

Further important features and advantages of the invention will emerge from the drawings and from the associated description of the figures. It is self-evident that the features specified above and the features yet to be explained below can be used not only in the respectively specified combination, but rather also in other combinations or individually without departing from the scope of the invention.

Preferred exemplary embodiments of the invention are illustrated in the drawings and are explained in more detail in the following description, with the same reference numerals being used to denote identical or similar or functionally identical components.

DETAILED DESCRIPTION OF THE PREFERRED EMBODIMENTS

Figure 1:
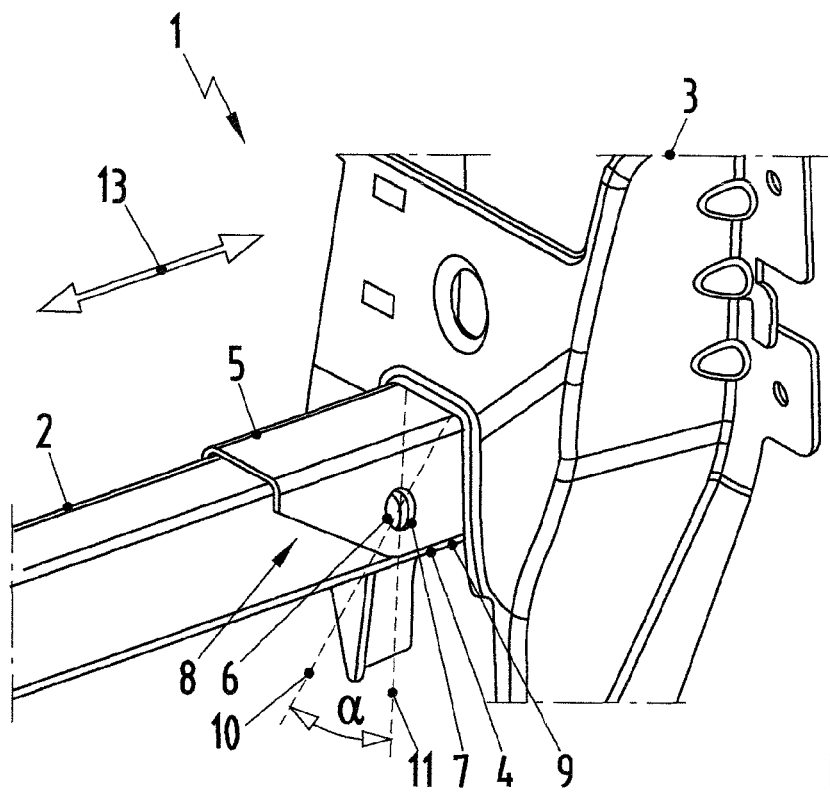
FIG. 1 is a schematic perspective view of a connecting arrangement.

A connecting arrangement in accordance with the invention is identified by the numeral 1 in FIG. 1. The connecting arrangement 1 comprises a stiffening beam 2 and a bracket 3. The stiffening beam 2 has a mounting section 4 and the bracket 3 has a mounting section 5. Two slots 6 are situated opposite one another in the mounting section 4 of the stiffening beam 2 and two slots 7 are arranged opposite one another on the mounting section 5 of the bracket 3. However, only one slot 6, 7 of the respective mounting section 4, 5 is visible in FIG. 1. The other slot 6, 7 is in the mounting section 4, 5 that is not visible in FIG. 1.

At least one of the mounting section 4 of the stiffening beam 2 and the mounting section 5 of the bracket 3 is a tube, such as a square, rectangular, round or oval tube. The tube need not be completely closed in the circumferential direction, but rather, part of one circumferential side is open to define a cutout 8. The cutout 8 simplifies the insertion of one mounting section 4, 5 into the other mounting section 5, 4. The cutout 8 extends only partially over the entire bracket-side mounting section 5 to define a substantially U-shape and to ensure a high degree of stability of the connecting arrangement 1. Therefore, a residual closed mounting section 9 remains and engages completely around the beam-side mounting section 4 to ensure adequate stability of the connecting arrangement 1, while at the same time the cutout 8 enables simplified mounting.

At least one inner surface and one outer surface of the mounting sections 4, 5 preferably are of complementary design to one another to further improve the stability of the connecting arrangement 1. In the example illustrated in FIG. 1, therefore, the outer surface of the beam-side mounting section 4 is of complementary design to the inner surface of the bracket-side mounting section 5. However, instead of the mounting section 5 of the bracket 3 being plugged onto the mounting section 4 of the stiffening beam 2, the mounting section 4 of the stiffening beam 2 could be plugged onto the mounting section 5 of the bracket 3. In this case, the outer surface of the bracket-side mounting section 5 can be of complementary design to the inner surface of the beam-side mounting section 4 to improve the stability.

Aside from the cutout 8, the mounting sections 4, 5 can at least partially engage around one another in the mounted position. Thus, the mounting sections 4, 5 may have plural regions that are discontinuous in the circumferential direction. In the mounted position of the mounting sections 4, 5, these discontinuous regions engage around in the circumferential direction in each case alternately in such a way that in each case a different mounting section 4, 5 is arranged at the outside in an alternating fashion in the circumferential direction.

At least the mounting section of the stiffening beam and/or of the bracket is formed from metal and preferably is produced from sheet steel. The sheet steel may, for example, be produced from HCT600X or 22MnB5. It is also expedient for at least the mounting section 4, 5 of the stiffening beam 2 and/or of the bracket 3 to have a wall thickness of 1.5 to 3.0 mm.

Figure 2:
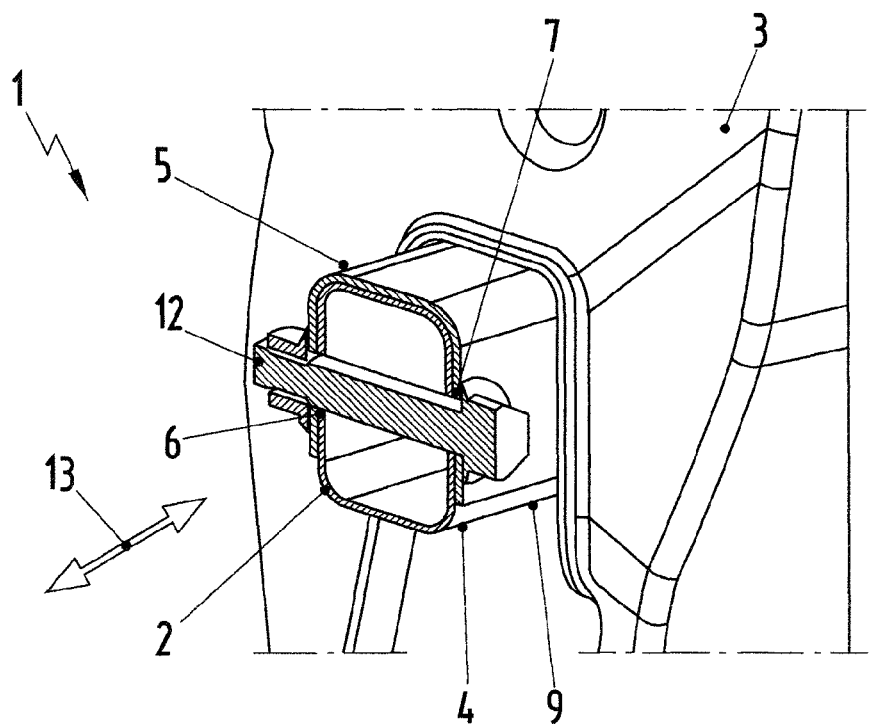
FIG. 2 is a section through a connecting region of the connecting arrangement with a connecting element.

A slot 6 of the mounting section 4 of the stiffening beam 2 and a slot 7 of the mounting section 5 of the bracket 3 are arranged to at least partially overlap in the mounted position in FIG. 1 and FIG. 2. The longitudinal axes 10, 11 of the slots 6, 7 enclose a predetermined angle α. Thus, the slots 6, 7 are offset from one another by the predetermined angle to facilitate the mounting or arrangement of a fastening element 12 in the slots 6, 7, as shown in FIG. 2. The alignment of the connecting arrangement 1 in a plugging-together direction 13 can be carried out even after the insertion of the fastening element 12, and furthermore, a subsequent correction of the connecting arrangement 1 in the plugging-together direction 13 is still possible.

A cross section of the at least one fastening element 12 and a through-opening formed by an intersecting portion of the two slots 6, 7 of the respective slot pair 6, 7 are of complementary design to one another to improve the stability of the connecting arrangement 1. Additionally, the cross section of the fastening element 12 has at least a diameter of 7.5 to 11 mm and/or is provided with an M10 or M12 thread. The fastening element 12 may also be a screw that extends through the two slot pairs 6, 7, as shown in FIG. 2, or in each case one slot pair 6,7 may be extended through separately by a rivet or screw. Likewise bolts that are held in the slots 6,7 by split pins may be used. Furthermore, one nut may be positioned in a movable fashion in the respective slot 6 of the beam-side mounting section 4 that is arranged at the inside. A screw can be screwed into nut to fix the mounting sections 4,5 with respect to one another.

The connecting arrangement 1 should be designed so that, up to a first predetermined action of force in the plugging-together direction 13, the two mounting sections 4, 5 can be loaded so that the connection between the mounting sections 4, 5 is not released and/or the mounting sections 4, 5 do not slip relative to one another and/or the connecting arrangement 1 is not permanently deformed. If the first predetermined action of force is exceeded, then up to a second predetermined action of force, the connecting arrangement 1 can deform in the plugging-together direction at most by a predetermined deformation travel in the plugging-together direction.

What is claimed is:

1. A connecting arrangement for connecting a stiffening beam to a bracket in a motor vehicle, the stiffening beam having a mounting section with two opposed walls formed with slots, the slots of the stiffening beam having longitudinal axes that are substantially parallel to one another, and the bracket having a mounting section with two opposed walls engaging the opposed walls of the stiffening beam and formed with slots, the slots of the bracket having longitudinal axes that are substantially parallel to one another, the slots being situated opposite one another in the respective mounting sections, the longitudinal axes of the slots of the bracket being offset from the longitudinal axes of the slots of the stiffening beam by a predetermined acute angle (α) in a mounted position of the mounting sections and forming an at least partially overlapping slot pair, at least one fastening element extending through the slots of the mounting sections in the mounted position.

2. The connecting arrangement of claim 1, wherein a cross sections of the at least one fastening element and a through-opening formed by an intersecting portion of the two slots of the respective slot pair are of complementary shapes.

3. The connecting arrangement of claim 2, wherein the cross section of the at least one fastening element has a diameter of 7.5-11 mm and has an M10 or M12 thread.

4. The connecting arrangement of claim 1, wherein the at least one fastening element is a screw, rivet or bolt.

5. The connecting arrangement of claim 1, wherein the mounting section of the bracket is a square, rectangular, round or oval tube open at least at one side in a circumferential direction.

6. The connecting arrangement of claim 1, wherein at least one inner surface and one outer surface of the mounting sections of the bracket and of the stiffening beam are of complementary shapes.

7. The connecting arrangement of claim 1, wherein the mounting section of the bracket engages at least partially around the mounting section of the stiffening beam in the mounted position.

8. The connecting arrangement of claim 1, wherein at least one of the mounting sections is formed from metal.

9. The connecting arrangement of claim 1, wherein at least one of the mounting sections has a wall thickness of 1.5-3.0 mm.

10. The connecting arrangement of claim 1, wherein the connecting arrangement can be loaded with a first predetermined action of force in a plugging-together direction of the two mounting sections without the connection between the mounting sections being released, without the mounting sections slipping relative to one another and without the connecting arrangement being permanently deformed.

11. The connecting arrangement of claim 10, wherein the connecting arrangement, in the event of a second predetermined action of force in the plugging-together direction, has a maximum predetermined deformation travel in the plugging-together direction.

12. A motor vehicle, comprising:
- a tubular stiffening beam extending in a transverse direction of the vehicle, at least one end of the stiffening beam having two opposed slots, the slots of the stiffening beams having a longitudinal axes that are substantially parallel; and
- a generally U-shaped bracket at a lateral side of the motor vehicle and being in nested engagement with the end of the stiffening beam, the bracket having two opposed slots with longitudinal axes that are substantially parallel to one another, the slots of the bracket being disposed to overlap with the slots of the stiffening beam, the longitudinal axes of the slots of the bracket being offset from the longitudinal axes of the slots of the stiffening beam by a predetermined acute angle ($\alpha$); and
- a fastening element extending through the slots of the stiffening beam and the slots of the bracket.

13. The motor vehicle of claim 12, wherein the end of the stiffening beam defines a substantially rectangular tube, and the U-shaped bracket nests closely with the end of the stiffening beam.

14. The motor vehicle of claim 12, wherein the fastening element is a screw, rivet or bolt.

15. The motor vehicle of claim 13, wherein the rectangular tube of the stiffening beam extends in a longitudinal direction, the longitudinal axes of the slots in the rectangular tube of the stiffening beam being aligned at an acute angle to the longitudinal direction of the rectangular tube of the stiffening beam.

16. The motor vehicle of claim 15, wherein the longitudinal axes of the slots in the bracket are aligned substantially normal to the longitudinal direction of the rectangular tube of the stiffening beam.

* * * * *